Patented June 30, 1942

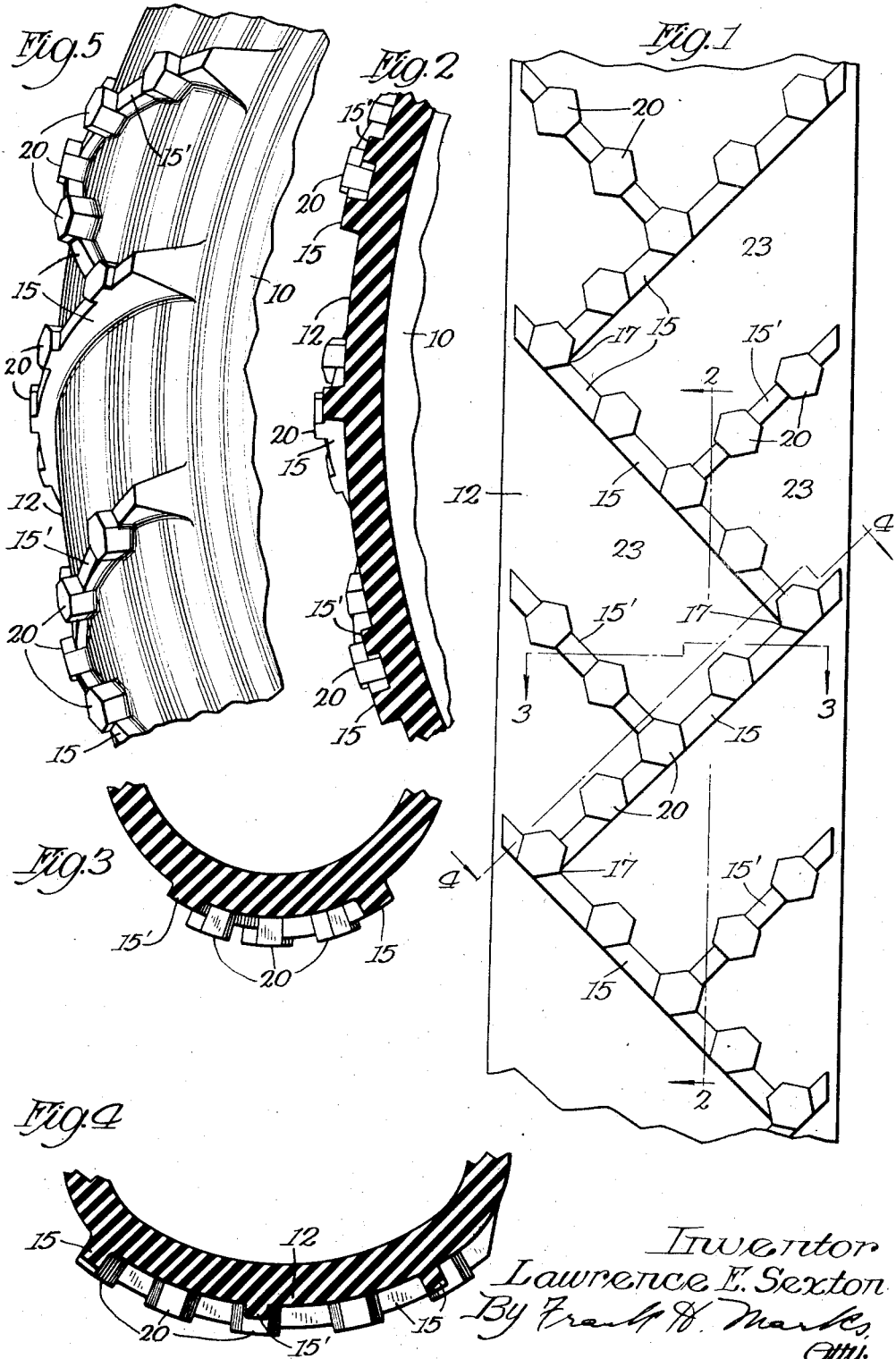

2,288,328

UNITED STATES PATENT OFFICE 2,288,328

PNEUMATIC TIRE

Lawrence E. Sexton, Oak Park, Ill., assignor to Sears, Roebuck and Co., Chicago, Ill., a corporation of New York Application May 23, 1938, Serial No. 209,479

4 Claims. (Cl. 152—209)

My invention relates to pneumatic tires for vehicles and has to do more particularly with a tire having an improved tread.

An object of my invention is to provide a tire with a tread which will give improved traction and which at the same time is substantially self-clearing of mud, etc.

My invention is especially applicable to tires for heavy vehicles such as tractors, trucks, etc., but is not limited thereto.

My invention contemplates a tire tread providing substantially parallel channels arranged in opposed diagonal relation to the center line of the tire tread and open adjacent the sides of the tire, the said channels being formed by a plurality of diagonal walls having protuberances or buttonlike members extending outwardly from said walls as well as laterally thereof.

I am aware that broadly similar channel shaped treads have been suggested in the prior art as, for example, in Hoover Patent 2,011,552, August 13, 1935. However, such prior art suggestions are subject to various objections, more especially in that they become clogged with mud and soft earth and then do not provide an efficient tractive surface.

I have found that the provision of buttons or protuberances adds greatly to the efficiency of performance of the tire.

My invention will be more clearly understood by reference to the drawing illustrating a preferred embodiment of my invention, wherein:

Fig. 1 is a developed view of the tread surface of a portion of a tire embodying my invention;

Figs. 2, 3 and 4 are fragmentary sectional views taken substantially along the lines 2—2, 3—3 and 4—4 of Fig. 1; and Fig. 5 is a fragmentary side elevational view.

In the tire illustrated, the numeral 10 represents the side wall thereof and 12 represents the tread portion.

On the tread portion I provide a plurality of main ribs 15 which extend diagonally in V-formation across the tire. It will be noted that the apices 17 of the V's are preferably beyond the center line of the tire. Extending parallel to the main ribs 15 are auxiliary ribs 15'. The ribs 15' may and preferably do substantially bisect the distance between a pair of the parallel main ribs 15. As will be seen in Fig. 4, the ribs 15' are somewhat lower than the main ribs 15.

Formed at any desired interval on the ribs 15 and 15' and preferably integral therewith is a plurality of protuberances, enlargements, projections, or buttons 20. Although I have shown these buttons in the form of hexagons for purposes of illustration and such form is at present preferred, I do not consider myself confined to this form but may give these members any variety of forms, either curved or angular in cross section. At any rate, said members 20, as seen best in Figs. 2, 3 and 4, project beyond the outer surfaces of the ribs 15 and 15' and are preferably substantially uniform in their elevation.

It will be seen from Fig. 1 that the buttons 20 may project from both sides of the auxiliary ribs 15' but project from only one side of the ribs 15, namely, that side of the ribs 15 which forms the base of the channels 23 in the direction in which the tire normally moves.

Thus, in normal use of the tire, it is intended that the lower portion of the tread shown in Fig. 1 will engage the earth first; in other words, that the tire as shown in this figure will move toward the observer or downwardly toward the ground, so that the bases of the channels 23 will engage the earth before the open ends thereof.

In operation, it has been found as a result of extensive tests, that the self-clearing ability of the channels 23 is greatly facilitated by means of the buttons 20. These buttons are continually flexing when subjected to pressure against the ground and thus tend to break and loosen earth which may become packed in the channels 23. Furthermore, even when these channels are filled with earth, the buttons project a substantial distance beyond the ribs which form the channels and thus these buttons constitute a substantial tractive area, so that, regardless of whether or not the channels are filled, sufficient traction is provided to prevent spinning under the worst conditions of mud, etc.

Various modifications and improvements coming within the spirit of my invention may suggest themselves to those skilled in the art and hence I do not wish to be limited to the specific form shown or uses mentioned except to the extent indicated in the appended claims.

I claim:

1. In a pneumatic tire, a tread portion comprising a plurality of main ribs extending obliquely and substantially perpendicular to each other from adjacent the sides of the tread, auxiliary ribs of less height than the main ribs extending parallel to said main ribs to form channels open only adjacent the sides of the tread, and spaced enlargements of substantially uniform height formed on and projecting outwardly from said ribs and into said channels and being of sufficient height as compared with their diameter and projecting radially of the tire a substantial distance beyond the ribs, whereby said enlargements are readily flexed when contacting the ground.

2. In a pneumatic tire, a tread having a continuous circumferential zig-zag rib, an auxiliary rib portion connected to an intermediate part of each section of said rib and extending substantially to a side of the tire and forming with the adjacent section of said rib a channel, and members on and spaced along and projecting laterally from said ribs, said members being of sufficient height as compared with their diameter to permit substantial flexing and extending a substantial distance beyond said ribs in directions transversely of said ribs and radially of the tire so as to aid in clearing said channels by a flexing action, while leaving said channels substantially unobstructed.

3. In a pneumatic tire, a tread portion comprising a plurality of ribs extending obliquely and in opposite directions across the tread to form oblique and oppositely disposed channels, said ribs having a plurality of spaced members formed thereon and projecting outwardly from said ribs transversely of said ribs and radially of the tire to such an extent as to be flexed by the terrain a substantial distance into the adjacent channel while leaving a substantially clear path in said channel for the outflow of materials lodged therein, said members being of sufficient height as compared with their diameter to permit substantial flexing thereof when contacting the ground.

4. A pneumatic tire having a tread portion comprising sets of parallel ribs upon opposite sides of the tread and positioned in opposite diagonal relation to the center line of the tire to form a repetition of V-shaped formations about the tire, each rib being connected at its inner extremity with an oppositely directed rib, the parallel ribs forming the grooves being located in the tread portion only and being substantially unobstructed to permit discharge of accumulations of mud laterally to the sides of the tire and at least some of said grooves extending from the edges of the tread to points beyond the center line of the tire and beyond the ends of the grooves extending from the opposite direction so that a continuous straight central rib about the tire is avoided, and spaced enlargements of substantially uniform height formed on said ribs, said enlargements being of sufficient height as compared with their diameter and projecting into said grooves and radially of the tire a sufficient distance to permit flexing action of said enlargements during traction, whereby material within said grooves is loosened.

LAWRENCE E. SEXTON.